June 26, 1945.  E. W. LOWE  2,379,014
CHAIN LOCK OR FASTENER
Filed Dec. 31, 1942
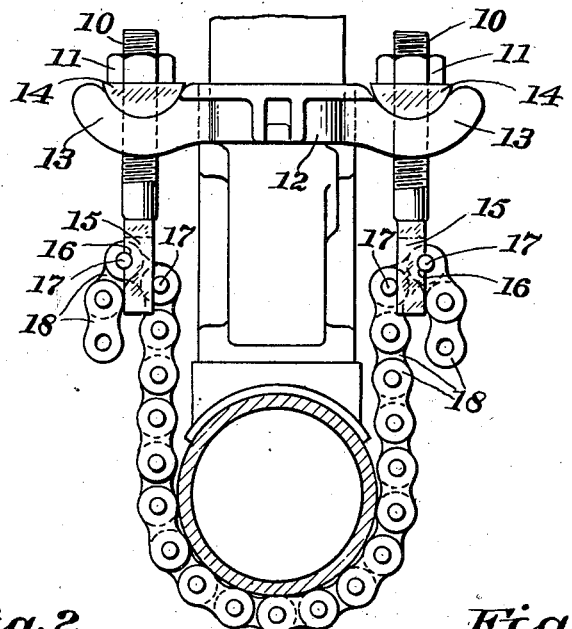
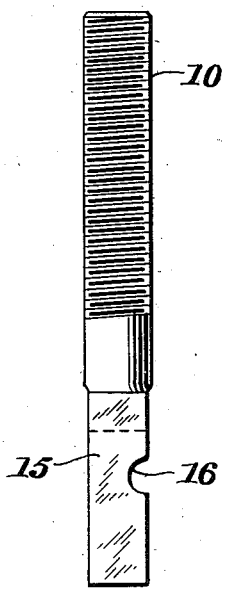
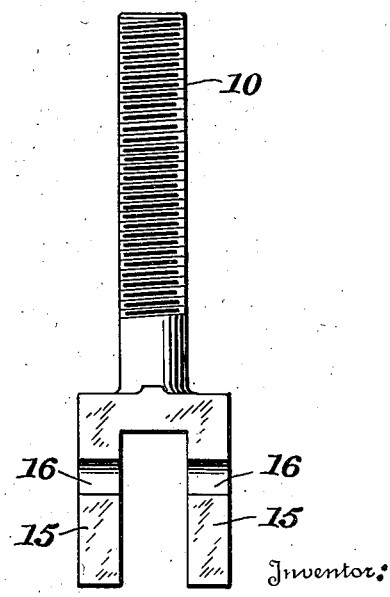
Inventor:
Earl W. Lowe,

UNITED STATES PATENT OFFICE 2,379,014

CHAIN LOCK OR FASTENER

Earl W. Lowe, Decatur, Ill., assignor to Mueller Co., Decatur, Ill., a corporation of Illinois Application December 31, 1942, Serial No. 470,897

4 Claims. (Cl. 24—116)

This invention relates to chain locks or fasteners designed to engage and hold chain lengths in operative positions.

It has for its purpose to provide a device of this type which is of simple and economical construction; which can be readily and quickly engaged and disengaged; which will not become distorted under heavy strains, and which will not become clogged with dirt or debris no matter under which conditions it may be used.

In the drawing herewith I have shown one embodiment of my invention and the best now known to me, but it is to be understood that this disclosure is illustrative and not restrictive, and mechanical variations from what is here shown and described may be made and still remain within the purview of my invention.

In the drawing:

Figure 1 shows the device with a machine for tapping mains.

Figure 2 is a side view of the chain coupling device.

Figure 3 is a front view of the chain coupling device.

The device is shown in connection with a tapping machine for tapping mains of the same general type shown in Mueller et al. patent, No. 265,624, dated October 10, 1882.

Referring to the drawing by numbers, which indicate the same parts in the several views, the device in the present adaptation is made up of a threaded shank 10 with a nut 11 by which the device may be attached or anchored to any support. As here shown, the tapping machine body and the main are shown in dotted lines, the yoke or collar 12 being provided with arms 13 which are engaged by rocking blocks 14 seated in the curved seats of the arms, the nut 11 engaging the upper end of the threaded shank 11 and resting upon the rocking block 14. This yoke or collar, with its supporting arms and rocking blocks, is common in the tapping machine art, and is illustrated in Patent No. 2,279,636, dated April 14, 1942, and no novelty attaches to this feature.

Extending from the shank 10 are a plurality of chain engaging arms 15, here shown as two in number, and of sufficient length to span the pivotal points of at least one link, as shown in Figure 1. The arms are provided with chain pintle seats 16 of sufficient depth to engage a chain pintle 17 or equivalent part. The seat 16 may be disposed on either side of the arms, and as shown in Figure 1, these arms may be placed in reversed positions, so that the seat 16 will engage the upper pintle 17 of the link.

Referring to Figure 1, it will be seen that the device is engaged with the chain made up of links 18 by engaging the ends of the arms 15 with the projecting ends of one of the pintles 17 of the link at one end, with the seats 16 on the opposite side of the arms engaging the ends of the pintle 17 at the opposite end of the link. When pull is exerted on the device it will, by reason of the opposed resistance on its opposite edges, be firmly locked to the chain, the seats 16 preventing any slipping of the device from its interlocked position on the pintles.

As shown in Figure 1, the main will be engaged by the chain and the arms of the interlocking device will be engaged with the projections or pintles on the chain so that with the parts in the position shown in Figure 1, the tapping machine shown, in dotted lines, may be drawn down tightly against the main, ready for the tapping operation, by turning the nuts 11 on the shanks 10 until the tapping machine is tightened in proper position.

The chain here shown is made up in the well-known form of bicycle or drive chain, except that the pintles 17 project outwardly beyond the outer faces of the links. It will be understood however, that other types of chain may be employed, the only need being that the chain construction shall be such as to permit spanning and engagement of link pintles or equivalent projections by the arms 15 and proper engagement of the seats 16 to interlock the device with the chain.

With the construction shown, the locking device can be quickly engaged and disengaged from the chain pintles by simply tilting it to the necessary angle for engagement and disengagement. By reason of the fact that the strain is directly across the arms of the device, there is no tendency for these arms to distort, spread, or straighten, as in the case in connection with some devices now in use. The construction is simple, for the device can be readily formed and the pintle seats made by a simple milling operation, doing away with the necessity of forming hooks to engage over the pintles. Another advantage is that when used with tapping or other types of machines which are operated on mains in trenches or ditches, or other places where fouling of the apparatus is likely, the device will not become clogged by mud or debris.

The device as here shown is applied to the chains of tapping machines, but it will be understood that it is applicable to any suitation where an easily applied and detached chain coupling appliance, which will efficiently interlock with and exert tension on a chain, is desirable.

Having made the required disclosure of my invention, I claim:

1. A device of the class described having a threaded shank portion for attachment to and adjustment on a suitable support, and a plurality of arms extending from said shank portion to span and engage two chain link pivots, said arms having chain link pivot seats in one of their pivot engaging edges.

2. A device of the class described having means for attaching it to a fixed support, two arms extending from said attaching means to engage on opposite sides pivot pintles extending outwardly from a chain link, said arms having pintle-receiving seats in one of their pintle engaging edges.

3. A chain coupling device of the class described comprising a plurality of arms to span and engage two chain link pivots, said arms having chain link pivot engaging means on one of their pivot engaging edges.

4. A chain coupling device of the class described comprising a plurality of arms to span and engage two chain link pivots, said arms having chain link pivot seats on one of their pivot engaging edges.

EARL W. LOWE.